United States Patent
Tseng (10) Patent No.: US 11,520,352 B2
(45) Date of Patent: Dec. 6, 2022

(54) GOLF COURSE ROUTE GUIDING SYSTEM

(71) Applicant: Ching Meng, Taipei (TW)

(72) Inventor: Pai-Yu Tseng, Taipei (TW)

(73) Assignee: Ching Meng, Taipei (TW)

( * ) Notice: Subject to any disclaimer, the term of this patent is extended or adjusted under 35 U.S.C. 154(b) by 398 days.

(21) Appl. No.: 16/739,879

(22) Filed: Jan. 10, 2020

(65) Prior Publication Data
US 2020/0241558 A1 Jul. 30, 2020

(30) Foreign Application Priority Data

Jan. 25, 2019 (TW) .................................. 108102875

(51) Int. Cl.
| | | |
|---|---|---|
| *A63F 9/24* | (2006.01) | |
| *A63F 11/00* | (2006.01) | |
| *G06F 13/00* | (2006.01) | |
| *G06F 17/00* | (2019.01) | |
| *G05D 1/02* | (2020.01) | |

(52) U.S. Cl.
CPC ........ *G05D 1/0278* (2013.01); *A63B 2220/12* (2013.01); *A63B 2220/13* (2013.01); *A63B 2220/14* (2013.01); *A63B 2225/50* (2013.01); *G05D 2201/0204* (2013.01)

(58) Field of Classification Search
CPC ... G07F 17/32; G07F 17/3213; G07F 17/3214
USPC ...................... 180/168; 463/1, 20, 22, 25, 30
See application file for complete search history.

(56) References Cited

U.S. PATENT DOCUMENTS

| | | | | |
|---|---|---|---|---|
| 7,480,569 | B2* | 1/2009 | Wehrlen | G05D 1/0274 |
| | | | | 701/487 |
| 11,048,255 | B2* | 6/2021 | Lee | A61B 5/4875 |
| 2010/0131443 | A1* | 5/2010 | Agarwal | G06N 5/02 |
| | | | | 706/46 |
| 2016/0339910 | A1* | 11/2016 | Jonasson | G08G 1/165 |

FOREIGN PATENT DOCUMENTS

JP 2000181540 A 6/2000

* cited by examiner

*Primary Examiner* — Adetokunbo O Torimiro
(74) *Attorney, Agent, or Firm* — Muncy, Geissler, Olds & Lowe, P.C.

(57) ABSTRACT

A golf course route guiding system includes a controller disposed on a vehicle and having a memory module, a positioning module, and a processing module. The memory module stores a field information of a golf course and a plurality of movement zones set corresponding to the field information. Each movement zone has a route range. The positioning module provides a location signal indicating a current location of the vehicle. The processing module receives the location signal and determines the movement zone in which the vehicle is located, and assigns a route range set in the corresponding movement zone, which is sent to the processing module, so that the processing module limits the vehicle to move in the assigned route range. When the vehicle enters another movement zone, the processing module reassigns a route range, achieving a dynamic route adjustment function.

10 Claims, 8 Drawing Sheets

GOLF COURSE ROUTE GUIDING SYSTEM

BACKGROUND OF THE INVENTION

1. Field of the Invention

The present invention relates to guiding systems, and more particularly, to a golf course route guiding system.

2. Description of the Related Art

Golf is an outdoor sport with a goal and direction orientation, and the player has to move between different fairways in a specific order. The golf course is usually wide-ranged. For the people running a golf course, the management operation for the course maintenance is relatively complicated, and different zones of the course have to be periodically under maintenance. Therefore, during the maintenance, flags or ropes are arranged for forbidding the players to enter the maintenance areas. However, some players still accidentally go across into the maintenance areas.

Referring to U.S. Pat. No. 7,480,569B2, a method and system for controlling a golf cart are provided. By acquiring the location information of the golf cart through the GPS, the location information is compared with the map indicating the entry forbidden area, such that upon entering the forbidden area, the golf cart is controlled to stop moving. Therefore, golf players are prevented from entering the forbidden area. However, such prior art applies the passive surveillance method, which stops the golf cart after detecting the golf cart entering the forbidden area, failing to hinder the entry route of the golf cart in advance. Also, the golf cart is allowed to freely move in the normal area. Although the freedom of movement for the golf player is facilitated, due to an incontrollable usage of the golf cart, the risk of golf course abrasion and depletion is increased and the efficacy of the course usage is reduced.

Further, a golf course includes different areas, namely fairway, rough, hazard, and green. For each area, growth of the grass and the height of the terrain are different. Not all of the areas are suitable for the golf cart to move thereon. Because of the weight and the wheel revolution of the golf cart, the course terrain is easily damaged, and the movement of the golf cart is affected. Therefore, a specific movement route is arranged with asphalt or cement for facilitating the movement of the golf cart, such that the golf players are able to drive the golf cart on the fixed route. However, when the ball is located distantly from the route, the golf player possibly drives the golf cart to deviate from the prearranged route, causing the damage of the golf course terrain.

Referring to the Japan patent publication number 2000-181540, an electromagnetic wire is embedded beneath the ground surface along the prearranged route, with a sensor disposed on the golf cart for sensing the electromagnetic wire beneath the ground surface, so as to guide the movement of the golf cart and prevent the golf cart from deviating from the prearranged route. Although the aforementioned prior arts may prevent the movement deviation of the golf cart, when a plurality of golf carts are driven on the identical route, the route is easily damaged by the weight and the wheels of the golf carts, and has to undergo maintenance operation frequently. Also, as for the area without the electromagnetic wires or when the electromagnetic wires are in need of maintenance, the movement guiding function is out of work, and the golf players have to manually drive the golf cart to bypass the maintenance areas. As a result, the players may accidentally drive the golf cart to enter the forbidden areas. Further, the arrangement of electromagnetic wires for the whole golf course, the sensors equipment on the golf cart, and the maintenance of the course and the golf carts cause a relatively huge expense.

SUMMARY OF THE INVENTION

For improving the issues above, a golf course route guiding system is disclosed. The movement route is dynamically appointed according to different area demands through a dynamic route planning method, so as to prevent a plurality of vehicles from moving on the identical route and damaging the golf course. In addition, the present invention limits the movement range and movement direction of the vehicle, and allows the vehicle to moderately deviate in the route range. Therefore, with the dynamic arrangement of the route and the random movement in the route range, the abrasion and depletion issues caused upon a fixed route are resolved.

For achieving the aforementioned objectives, a golf course route guiding system is provided, comprising: a controller disposed on a vehicle and having a memory module, a positioning module, and a processing module; the memory module storing a field information of a golf course and a plurality of movement zones set corresponding to the field information, each of the movement zones comprising at least one route range; the positioning module providing a location signal indicating a current location of the vehicle; the processing module receiving the location signal and determining one of the movement zones corresponding to the field information of the golf course in which the vehicle is located, and assigning a route range set in the corresponding movement zone and sending the route range to the processing module, such that the processing module limits the vehicle to move in the assigned route range; wherein when the vehicle enters from one of the movement zones into another one of the movement zones, the processing module reassigns a route range corresponding to the movement zone in which the vehicle is located.

With such configuration, the present invention sets the field information into a plurality of movement zones and specifies the route range within each movement zone according to demands for facilitating the movement of the vehicle. Once the vehicle enters different movement zones, the route range of the vehicle in the current movement zone is assigned, so as limit the vehicle to move in the assigned route range. Therefore, with the dynamic route arrangement method according to the demands of different movement zones, the route range of the vehicle is limited, so as to prevent the vehicle from deviating the arranged route during the movement process.

Further, with the dynamic route arrangement method, the vehicle is prevented from moving along an identical linear route, by which damage will possibly be caused upon the golf course along the fixed route and the cost of maintenance will be increased.

Also, when limiting the movement range and the movement direction of the vehicle, the present invention still allows the vehicle to moderately deviate in the route range, so as to, by the dynamically arrangement of the route and the randomly arranged movement in the route range, prevent the abrasions from occurring along the fixed route, saving the need of laying the road surface formed of special materials and textures.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 4, a golf course route guiding system 100 in accordance with the first embodiment of the present invention is provided, comprising following components.

Figure 1:
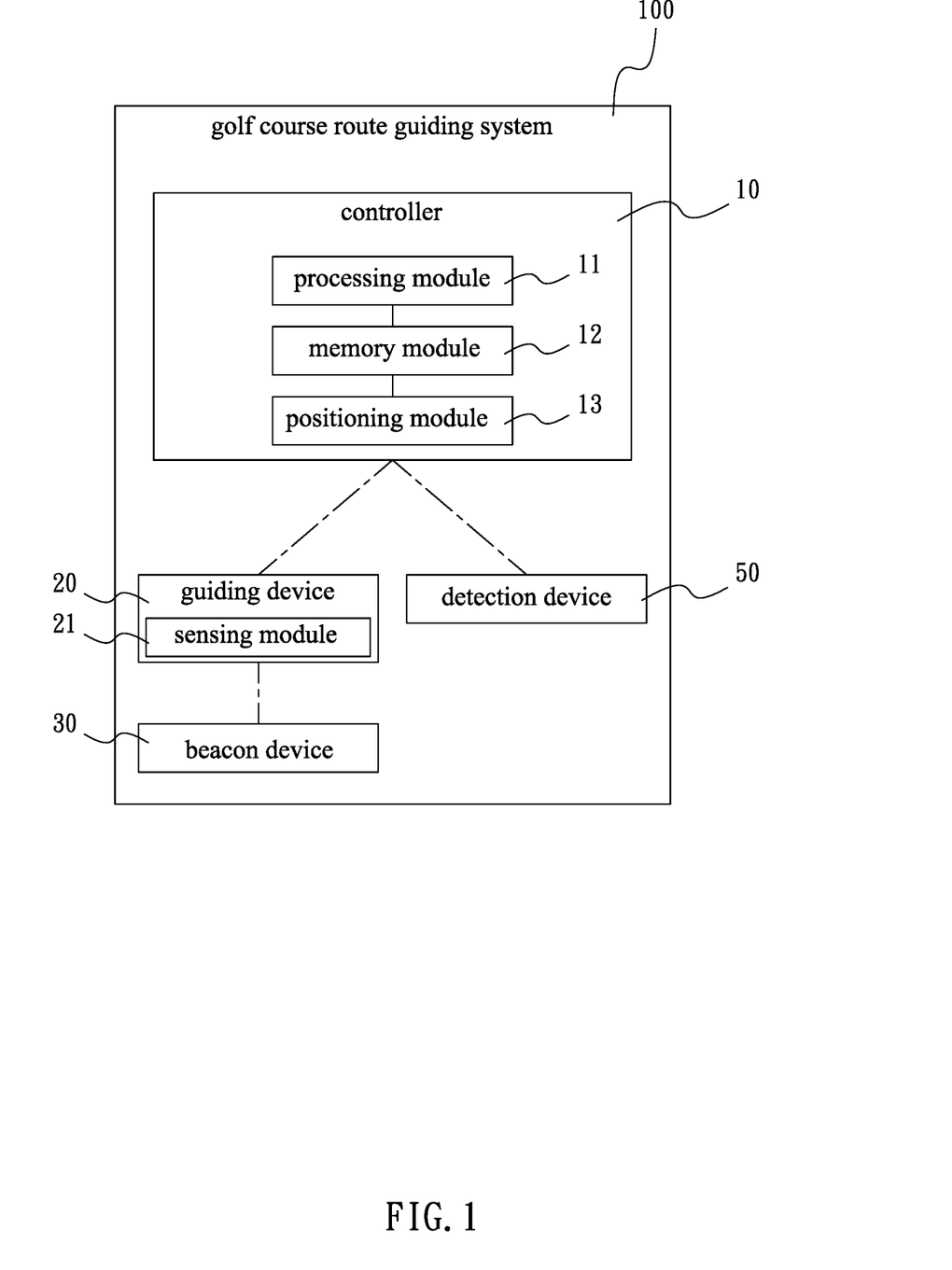
FIG. 1 is a structural block view illustrating the system in accordance with the first embodiment of the present invention.

A controller 10 is disposed on a vehicle 1. In an embodiment of the present invention, the vehicle 1 is a golf cart, which internally comprises a seat 2, a driving device 3 (such as a throttle, steering wheel, brake, or control stick) and a propelling device 4 (such as engine and wheels). When the user 5 sits on the seat 2 in the vehicle 1, the user 5 controls the propelling device 4 through the driving device 3 for motivating the vehicle 1 to move forward or turn. Alternatively, the user 5 holds a remote control device 6 to remotely control the propelling device 4 from outside of the vehicle 1 for motivating the vehicle 1 to move.

The controller 10 comprises a processing module 11, which is coupled with the driving device 3, the propelling device 4, and the remote control device 6. The processing module 11, according to a switch signal, is able to control the vehicle 1 to move in an operation mode or a following mode. The switch signal is allowed to be generated by a button on the vehicle 1 or by the remote control device 6.

When the processing module 11 controls the vehicle 1 to move in the operation mode, the user 5 is allowed to control the vehicle 1 to move through the driving device 3 or the remote control device 6. In the embodiment, the processing module 11 is, for example but not limited to, a microcontroller belonging to the Microchip PIC32MX series, or an embedded type controller.

Figure 4:
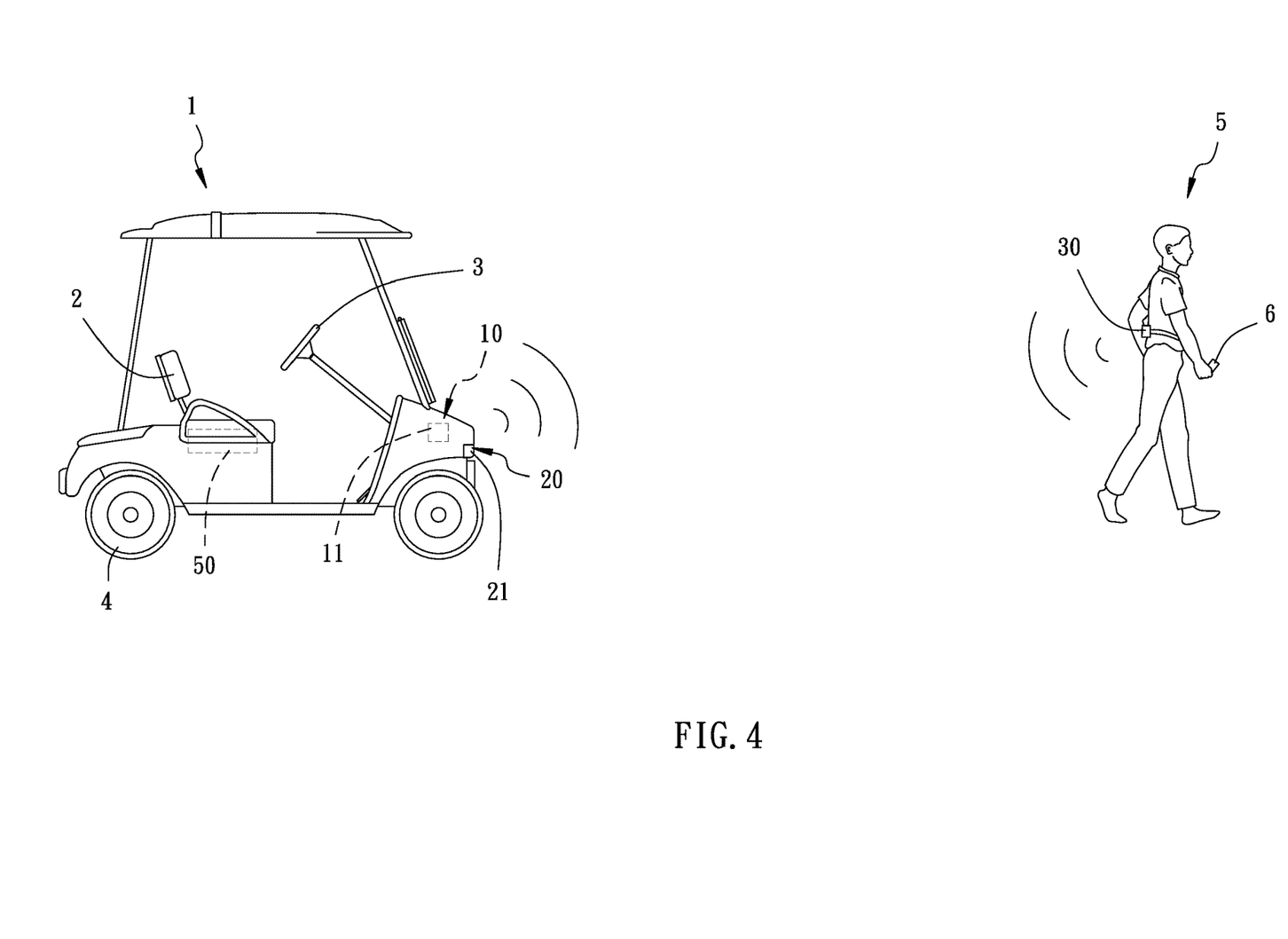
FIG. 4 is a schematic view illustrating the vehicle following the user to move in the following mode.

Referring to FIG. 4, the vehicle 1 is provided with a guiding device 20 coupled with the processing module 11 of the controller 10, and the user 5 wears a beacon device 30. The guiding device 20 has a plurality of sensing modules 21. The sensing modules 21 are allowed to be disposed on the head portion, rear portion, or lateral portions of the vehicle 1. In the embodiment, the amount and the position of the sensing modules 21 are not limited, as long as the sensing modules 21 are able to be signally connected with the beacon device 30. In the embodiment, two sensing modules 21 are provided and disposed on two sides of the head portion of the vehicle 1, respectively. The two sensing modules 21 are connected with the beacon device 30 by use of an ultra-wideband (UWB) communication. The sensing modules 21 and the beacon device 30 are allowed to be a communication device which applies the IEEE 802.15.4a UWB technique.

When the processing module 11 controls the vehicle 1 to move in the following mode, the two sensing modules 21 send out a first signal, respectively. The beacon device 30 receives the two first signals, which are processed and embedded with a processing time by the beacon device 30 and subsequently sent back as a second signal to the sensing module 21. When the processing module 11 receives the second signal, by firstly subtracting the time at which the first signal was sent and then subtracting the time at which the beacon device 30 processed the first signal from the time at which the second signal was received, transmission times of the first signals and the second signal are acquired. Then, by firstly multiplying the transmission time by the light speed, and secondly dividing the summation thereof by 2, the distances of the two sensing modules 21 with respect to the beacon device 30 are acquired, respectively. Because of the fixed distance between the two sensing modules 21, the distance and direction from the center of the vehicle 1 to the beacon device 30 are able to be calculated through a trigonometric function calculation, so as to generate a movement signal. Then, the processing module 11, according to the movement signal, controls the vehicle 1 to follow the user 5.

The controller 10 comprises a memory module 12, wherein the memory module 12 is allowed to be, for example, an external Secure Digital (SD) Memory Card or an external flash memory. The memory module 12 stores a field information 40 of a golf course in which the vehicle 1 is located and a plurality of movement zones 41 set corresponding to the field information 40. Each movement zone 41 is provided with at least one route range 42 set according to user demand, wherein the route range 42 includes an obstacle zone 43. Each two neighboring movement zones 41 partially overlap. Each movement zone 41 comprises a target point 44, which is allowed to be disposed on the overlapping portion of two neighboring movement zones 41 or disposed on any location within the movement zone 41. Therein, the obstacle zone 43 is allowed to be the teeing ground, green, bunker, water hazard, tree, maintenance area, or terrains having relatively greater height variations. The number of the obstacle zones 43 is set according to different route ranges 42.

Figure 2:
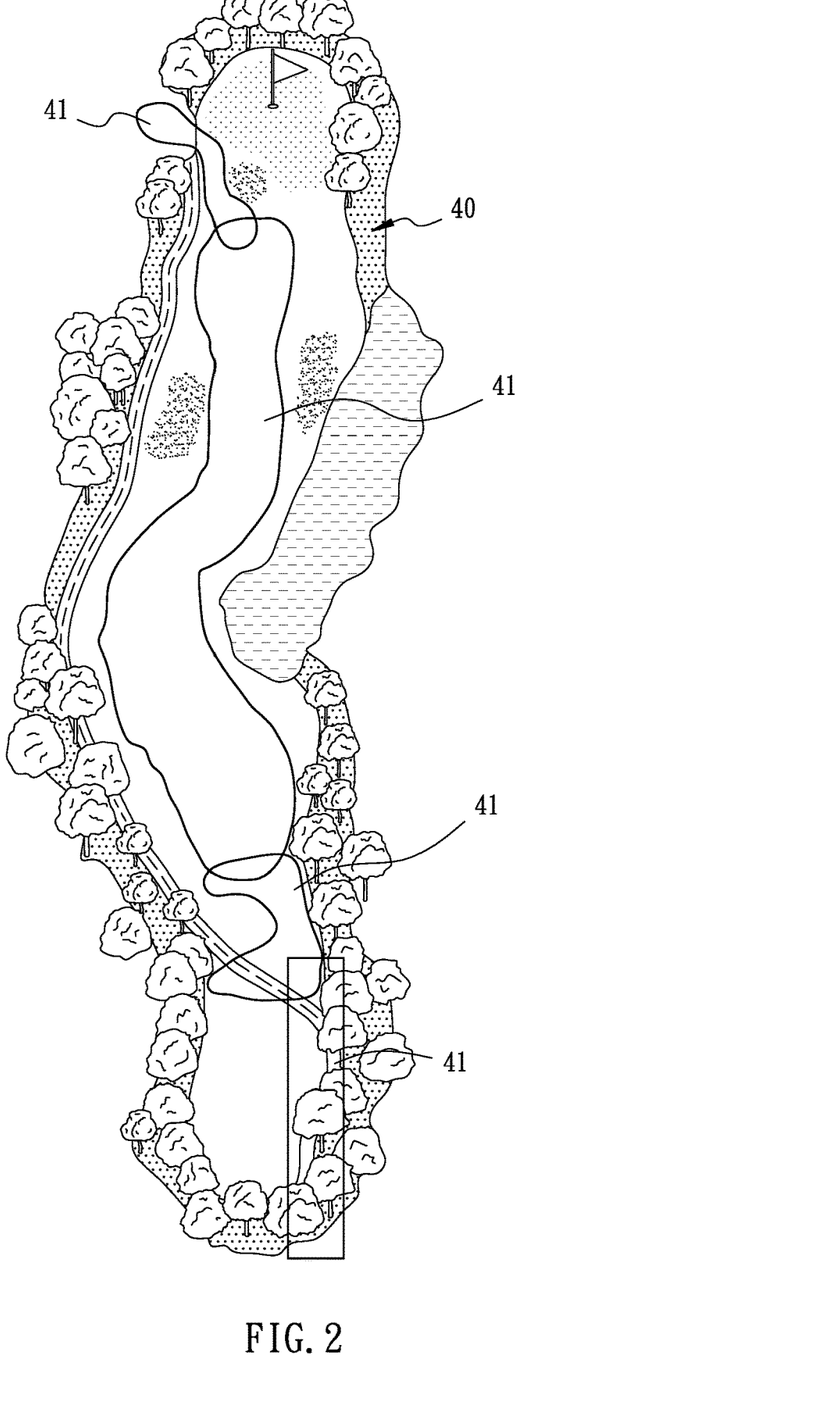
FIG. 2 is a schematic view illustrating the movement zones in the field information.

In the embodiment, the field information 40 is the longitude and latitude coordinates of the golf course acquired through the satellite image, so as to set the movement zones 41 in the field information 40 according to the longitude and latitude coordinates. Each movement zone 41 is an enclosed range formed of a plurality of two-dimensional coordinates, as shown by FIG. 2. The route range 42 is formed of a plurality of two-dimensional coordinates, and the number of the route range 42 is set according to the area and the properties of the corresponding movement zone 41. Therefore, the memory module 12 stores the longitude and latitude coordinates of the field information 40, the plurality of the two-dimensional coordinates of each movement zone 41, the plurality of the two-dimensional coordinates of the route range 42 corresponding to each movement zone 41, and the plurality of the two-dimensional coordinates of the target point 44 of each movement zone 41 and the obstacle zone 43 in different route ranges 42.

In addition, each movement zone 41 is divided into a guiding zone 411 and a manual control zone 412, wherein the amount of the guiding zone 411 and the amount of the manual control zone 412 are respectively, for example but not limited to, at least one. In the embodiment, referring to FIG. 3, a plurality of guiding zones 411 and one manual control zone 412 are included, wherein the manual control zone 412 overlaps one of the guiding zones 411, and the guiding zones 411 and the manual control zone 412 correspond to the fairway of the golf course. The guiding zones 411 comprises a first guiding zone 411a, a second guiding zone 411b, and a third guiding zone 411c. The first guiding zone 411a partially overlaps the manual control zone 412. Therein, the area of the first guiding zone 411a is smaller than the area of the second guiding zone 411b, and the area of the third guiding zone 411c is smaller than the area of the first guiding zone 411a. Thus, the first guiding zone 411a comprises two route ranges 42, the second guiding zone 411b comprises three route ranges 42, the third guiding zone 411c comprises one route range 42, and the manual control zone 412 is considered as one route range 42.

The controller 10 has a positioning module 13 for generating and providing the location signal of the vehicle 1 in the golf course. Therein, the positioning module 13 generates the location signal which is a two-dimensional coordinate through a GPS or other positioning system. In the embodiment, the positioning module 13 generates the two-dimensional coordinate through a real time kinematic (RTK) system.

The processing module 11 of the controller 10 receives the location signal sent by the positioning module 13, and acquires the information stored by the memory module 12, so as to determine one of the movement zones 41 of the golf course in which the vehicle 1 is located, and acquires the route range 42 stored by the memory module 12 according to the movement zone 41, thereby distributing or randomly generating one of the route ranges 42 as the assigned route range 42, such that the processing module 11 limits the vehicle 1 to move according to the assigned route range 42 in the following mode or the operation mode. Therein, the processing module 11 limits the vehicle 1 to move in the assigned route range 42 in one of the movement zones 41 toward the target point 44 in another movement zone 41. Therefore, the target point 44 is a reference position point for guiding the vehicle 1 to move toward the certain direction in the route range 42. When the vehicle 1 enters from the current movement zone 41 into another movement zone 41, the processing module 11 reassigns the route range 42 corresponding to the movement zone 41 in which the vehicle 1 is located.

Thus, when the processing module 11 receives the location signal which is generated by the positioning module 13 according to the current location of the vehicle 1, the processing module 11 calculates to acquire the route range 42 and the obstacle zone 43 in the target movement zone 41 in which the movement of the vehicle 1 is to be limited, and the two-dimensional coordinate of the target point 44 of the next movement zone 41, such that the processing module 11 limits the movement range of the vehicle 1 according to the calculation result. When the processing module 11 controls the vehicle 1 to move in the assigned route range 42, the vehicle 1 is controlled to avoid the obstacle zone 43.

Furthermore, when the processing module 11 determines that the vehicle 1 approaches the border of the movement range (the route range 42 of the guiding zone 411, the route range 42 of the manual control zone 412, or a sidewalk zone 413), the processing module 11 generates and sends out a warning signal for reminding the user 5. When the vehicle 1 is about to surpass the movement range limitation (the route range 42, manual control zone 412, or the sidewalk zone 413), the user 5 is able to adjust the movement direction of the vehicle 1, controlling the vehicle 1 to move away from the border of the limited movement range. Therein, the warning signal varies according to distance between the vehicle 1 and the border of the limited movement range. In the embodiment, when the distance between the vehicle 1 and the border of the limited movement range becomes smaller, the processing module 11 gradually increases the frequency of the acousto-optic warning signal. In other words, when the vehicle 1 approaches the border of the limited movement range, the processing module 11 sends out a low frequency acousto-optic warning. When the vehicle 1 continues to move toward the border of the limited movement range, the processing module 11 keeps increasing the frequency of the acousto-optic warning. When the vehicle 1 reaches the border of the limited movement range, the processing module 11 sends out the high frequency acousto-optic warning and stops the movement of the vehicle 1, whereby the vehicle 1 is only allowed to turn or reverse for moving away from the border of the limited movement range. When the vehicle 1 moves and leaves the border of the limited movement range, the processing module 11 terminates the warning signal.

Figure 3:
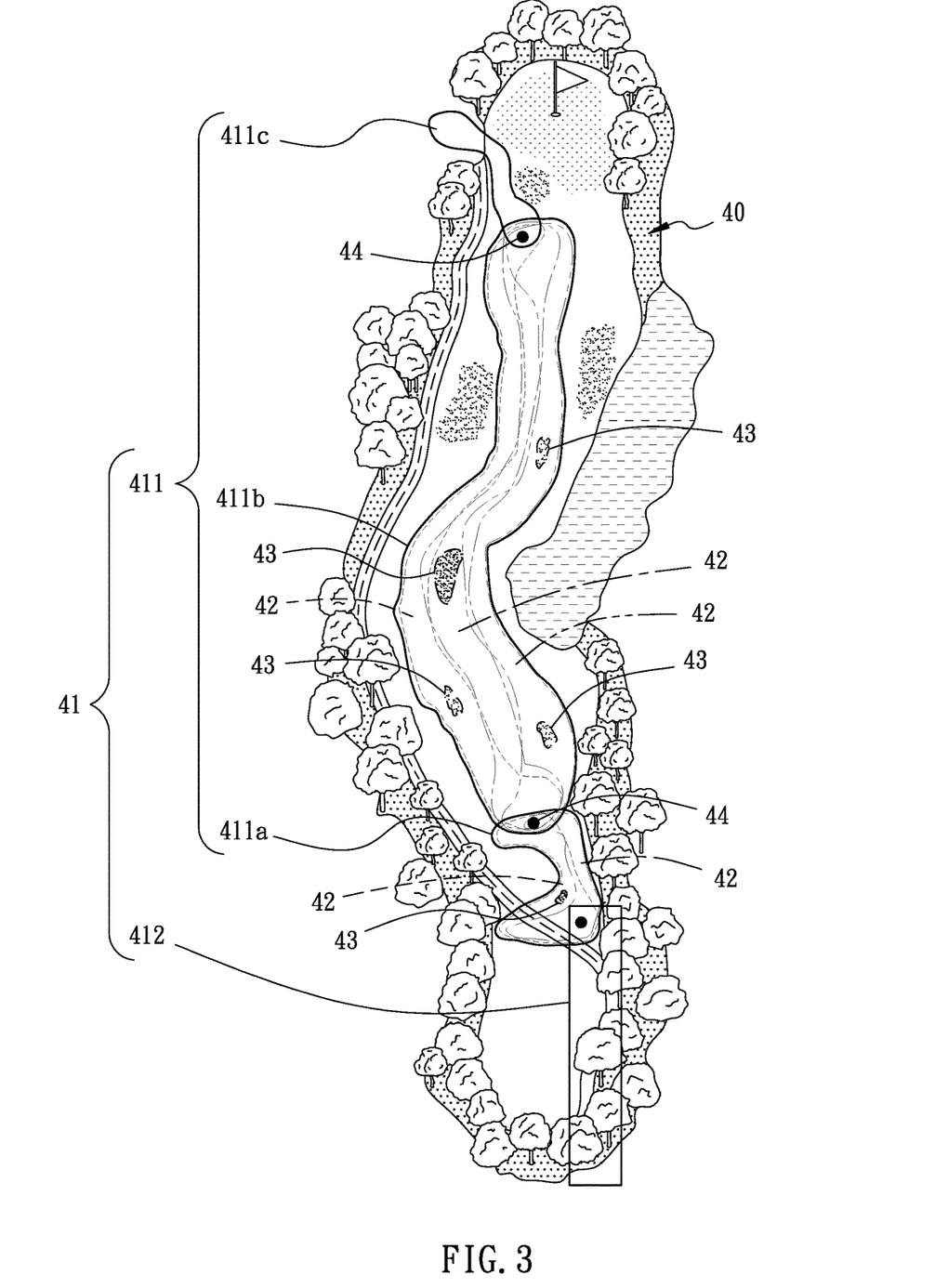
FIG. 3 is a schematic view illustrating each movement zone in the field information provided with a route range.

For example, referring to FIG. 1, FIG. 3, and FIG. 4, when the user 5 is to drive the vehicle 1 to enter the field information 40 corresponding to the golf course, the vehicle 1 enters from the manual control zone 412, in which the terrain is relatively abrupt or unstable location signal is generated when the transmission of the positioning module 13 is frequently hindered. For preventing the vehicle 1 from unfavorable movement due to the abrupt terrain in the following mode, when the vehicle 1 is in the manual control zone 412, the processing module 11 sends out a switch signal, whereby the processing module 11 operates the vehicle 1 to move in the operation mode. In other words, if the vehicle 1 originally moves in the following mode, after the vehicle 1 entering the manual control zone 412, the processing module 11 of the vehicle 1 switches to the operation mode, so that the user 5 controls the vehicle 1 to move through the driving device 3 or the remote control device 6. The processing module 11 acquires the two-dimensional coordinates of the manual control zone 412 stored in the memory module 12, whereby the processing module 11 limits the vehicle 1 to move in the range of the manual control zone 412 in the operation mode toward the target point 44 in the first guiding zone 411a.

Next, when the vehicle 1 moves to the target point 44 in the first guiding zone 411a, the processing module 11 sets the first guiding zone 411a as the limited movement range of the vehicle 1, and distributes or randomly generates one of the route ranges 42 as the assigned route range 42. When the vehicle 1 enters the first guiding zone 411a, the vehicle 1 moves in the following mode, and the user 5 is located in front of the vehicle 1. The guiding device 20 is able to detect the beacon device 30 wore on the user 5, and the processing module 11 then controls the vehicle 1 to move in the assigned route range 42 toward the target point 44 in the second guiding zone 411b. Therefore, the processing module 11 continuously guides the vehicle 1 to move in the similar manner.

When the user 5 walks to an area which is out of the route range 42 to strike the golf ball, the vehicle 1 stops to wait on the border of the route range 42 and sends out the warning signal to notify the user 5 that the vehicle 1 stops following.

Meanwhile, the user 5 is able to send out the switch signal through the remote control device 6, such that the vehicle 1 is controlled by the remote control device 6 to move in the assigned route range 42 in the operation mode for heading toward the target point 44 of the next movement zone 41. Alternatively, the user 5 is able to go back to the location in front of the vehicle 1, such that the vehicle 1 is restored to the following mode and follows the user 5 to move in the assigned route range 42.

In addition, the vehicle 1 is further provided with a detection device 50 coupled with the processing module 11 of the controller 10 for detecting if the user 5 sits on the seat 2 in the vehicle 1. When the user 5 is deemed sitting on the seat 2 in the vehicle 1, the detection device 50 generates a detection signal, and, according to the detection signal, the processing module 11 allows the user 5 to control the vehicle 1 through the driving device 3 or the remote control device 6 to move in the operation mode. In other words, when the vehicle 1 originally moves in the following mode, and the detection device 50 generates the detection signal, the processing module 11 will switch the vehicle 1 from the following mode to the operation mode, without the need of receiving the switch signal, so as to facilitate the convenience of usage for the user 5. Therein, the detection device 50 is allowed to be a location detection device, infrared device, ultrasonic device, infrared temperature detection device or a pressure detection device, and the detection signal is allowed to be the location signal, temperature signal or weight pressure signal detected from the user 5. However, the present invention is not limited to the embodiments herein provided.

Referring to FIG. 5 to FIG. 8, a second embodiment of the present invention is provided. The difference of the second embodiment lies in that the golf course route guiding system 100 further comprises a surveillance program product 60.

Figure 5:
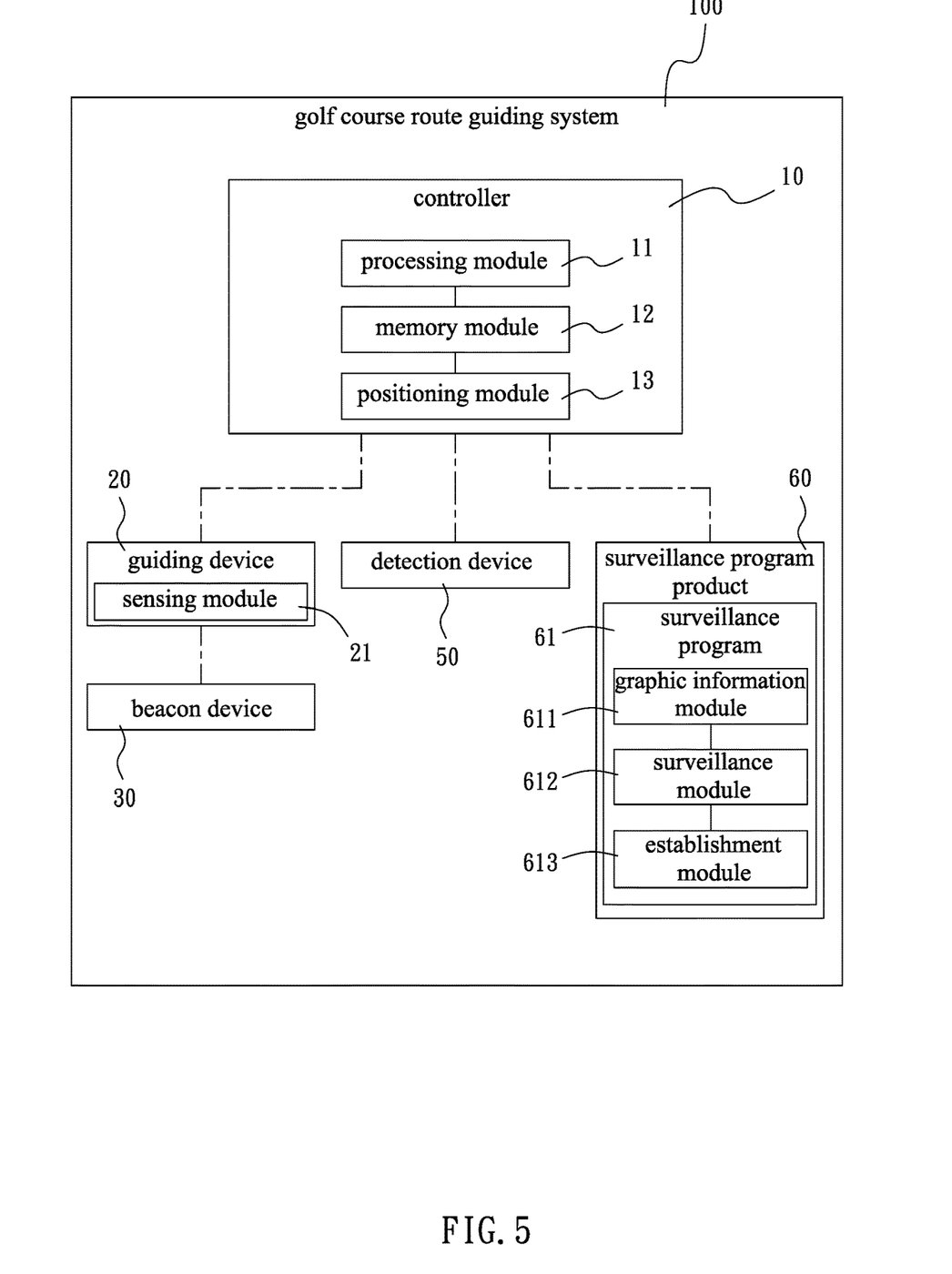
FIG. 5 is a structural block view illustrating the system in accordance with the second embodiment of the present invention.
Figure 6:
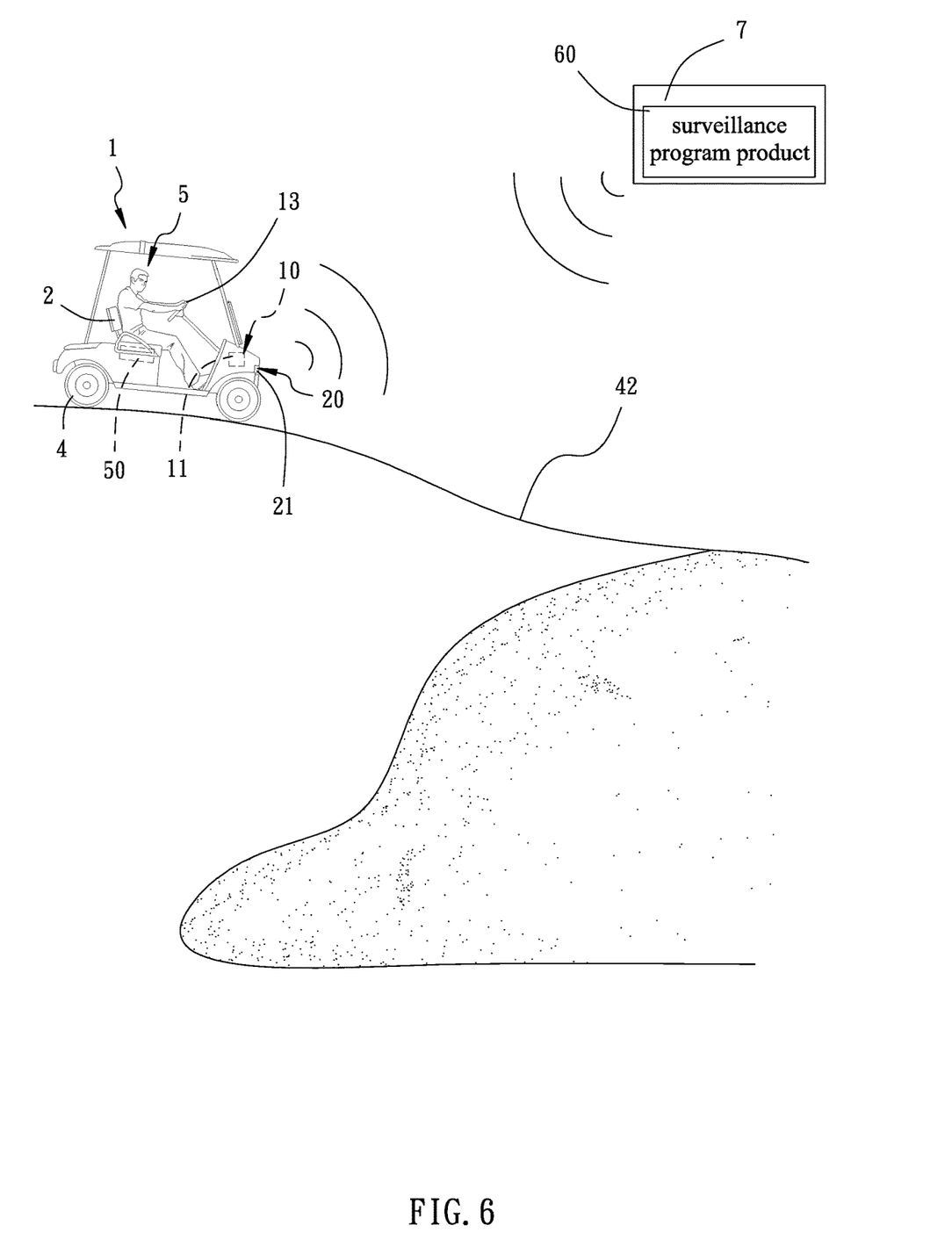
FIG. 6 is a schematic view illustrating the vehicle wirelessly connected with the terminal device

The surveillance program product 60 is internally provided with a surveillance program 61 which is able to be loaded and run by a terminal device 7, and the administrator of the golf course is allowed to use the surveillance program 61 through the terminal device 7. The surveillance program 61 comprises a graphic information module 611 and a surveillance module 612. The graphic information module 611 stores the information of field information 40, the movement zones 41, the route ranges 42, the obstacle zones 43, and the target points 44.

The surveillance program 61 is allowed to be signally connected with the controller 10 through the communication function of the terminal device 7. The surveillance module 612 of the surveillance program 61 receives the location signal from the positioning module 13 and acquires the information stored by the graphic information module 611, so as to determine one of the movement zones 41 in which the vehicle 1 is located. The surveillance module 612 is able to assign the route range 42 set in the corresponding movement zone 41, and the route range 42 is sent to the processing module 11 of the controller 10, so that the processing module 11 limits the vehicle 1 to move in the assigned route range 42. Therein, when the user 5 controls the vehicle 1 to move in the operation mode, if the vehicle 1 controlled by the user 5 moves to approach or out of the border of the limited movement range, the processing module 11 generates the warning signal, allowing the administrator of the golf course to use the surveillance program 61 through the terminal device 7; also, the surveillance module 612 sends out an operation halting command to the processing module 11 of the controller 10, so that the processing module 11 stops the movement of the vehicle 1 according to the operation halting command.

In addition, when the controller 10 is unable to be signally connected with the terminal device 7 which runs the surveillance program 61, the processing module 11 of the controller 10 generates the movement range for limiting the movement of the vehicle 1.

The surveillance program 61 has an establishment module 613. The establishment module 613 acquires the field information 40 of the golf course, and allows the administrator of the golf course to set the field information 40 into a plurality of movement zones 41, and sets the route ranges 42 corresponding to each of the movement zones 41, wherein the route ranges 42 comprise the obstacle zones 43 and the target points 44 of the movement zones 41. The information established by the establishment module 613 is able to be stored in the graphic information module 611. In the embodiment, the longitude and latitude coordinates of the golf course acquired by the establishment module 613 through the satellite image is determined as the field information 40, and the field information 40 is set into each movement zone 41 according to the longitude and latitude coordinates. Each movement zone 41 is an enclosed range formed of a plurality of two-dimensional coordinates. The route range 42 formed of the two-dimensional coordinates is set in each movement zone 41. Also, the obstacle zone 43 is an enclosed range formed of a plurality of two-dimensional coordinates.

Figure 7:
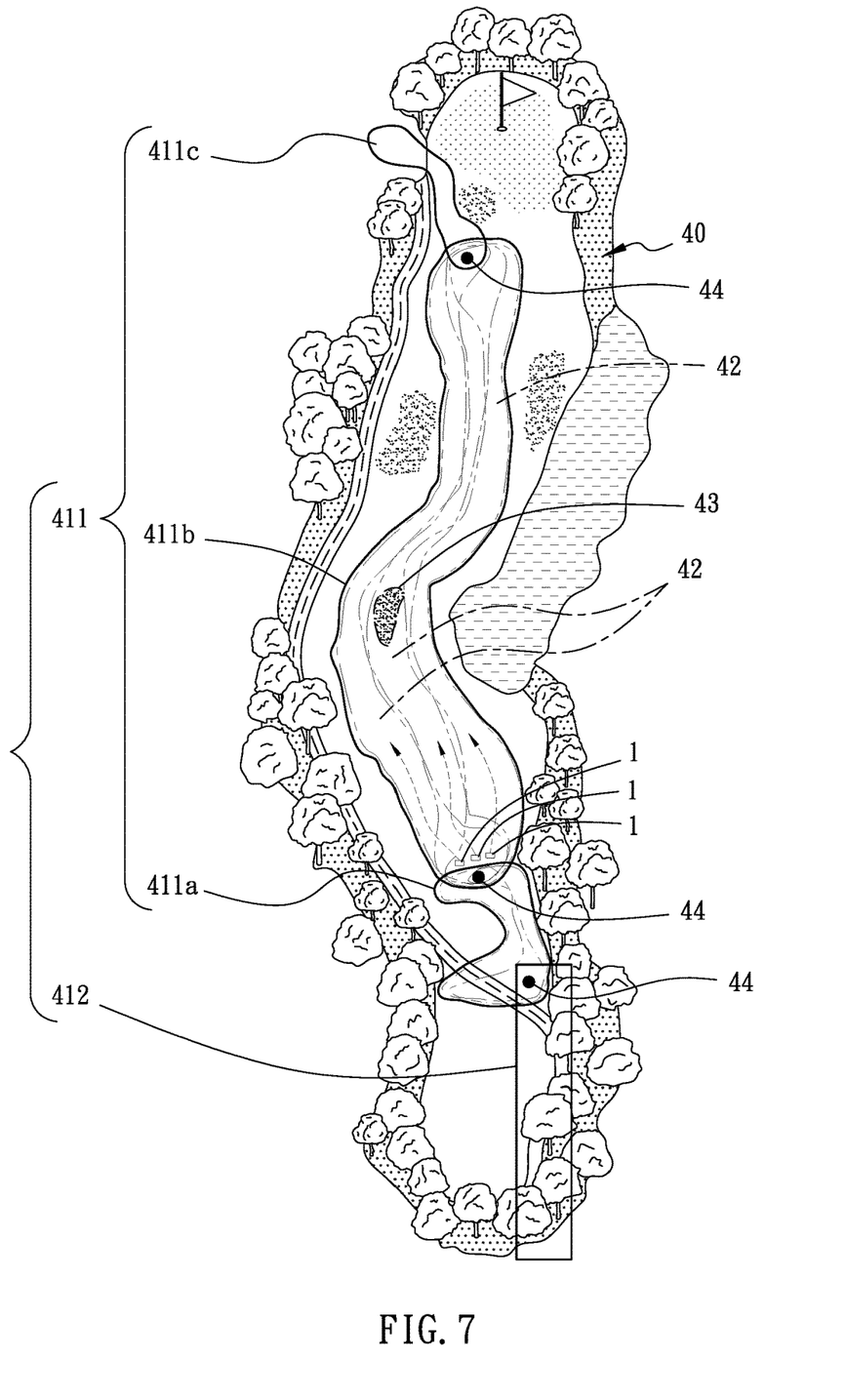
FIG. 7 is a schematic view illustrating different vehicles assigned to move in different route ranges.

Referring to FIG. 5 and FIG. 7, when a plurality of vehicles 1 are provided, as soon as each vehicle 1 enters the second guiding zone 411b, respectively, the surveillance module 612 calculates the route range 42 of each vehicle 1 through distribution or random calculation, such that each vehicle 1 is limited to move in different route ranges 42, respectively (as shown by the arrows in FIG. 7). Therein, each route range 42 is provided with an exclusive code (for example: the codes for three route ranges 42 in the second guiding zones 411b being 2-1, 2-2, and 2-3, respectively). The surveillance module 612 calculates the codes of the route ranges 42 to be assigned in the second guiding zone 411b through a distribution or random numbering method, so as to easily and efficiently generates random and non-repetition codes, thereby acquiring the assigned route ranges 42. Notably, when only one vehicle 1 is provided and enters the movement zones 41 having a plurality of route ranges 42 (such as the first guiding zone 411a and the second guiding zone 411b), the surveillance module 612 still acquires the assigned route range 42 through the distribution or random numbering method.

Further, when the surveillance module 612, according to the location signal generated by the positioning module 13 of the vehicle 1, generates the assigned route range 42, the surveillance module 612 transmits the assigned route range 42 and the corresponding obstacle zone 43 in the route range 42 to the processing module 11 of the controller 10, and the processing module 11 controls the vehicle 1 to move in the assigned route range 42 and avoid the obstacle zone 43 simultaneously.

Also, the movement zone 41 further includes the sidewalk zone 413. The number of the sidewalk zone 413 is allowed to be one or more. However, the present invention is not limited to the embodiments herein provided. In the embodiment, referring to FIG. 8, a plurality of the sidewalk zones 413 are provided. The sidewalk zone 413 corresponds to the coarse grass area in the golf course. One of the sidewalk zone 413 partially overlaps the manual control zone 412.

Figure 8:
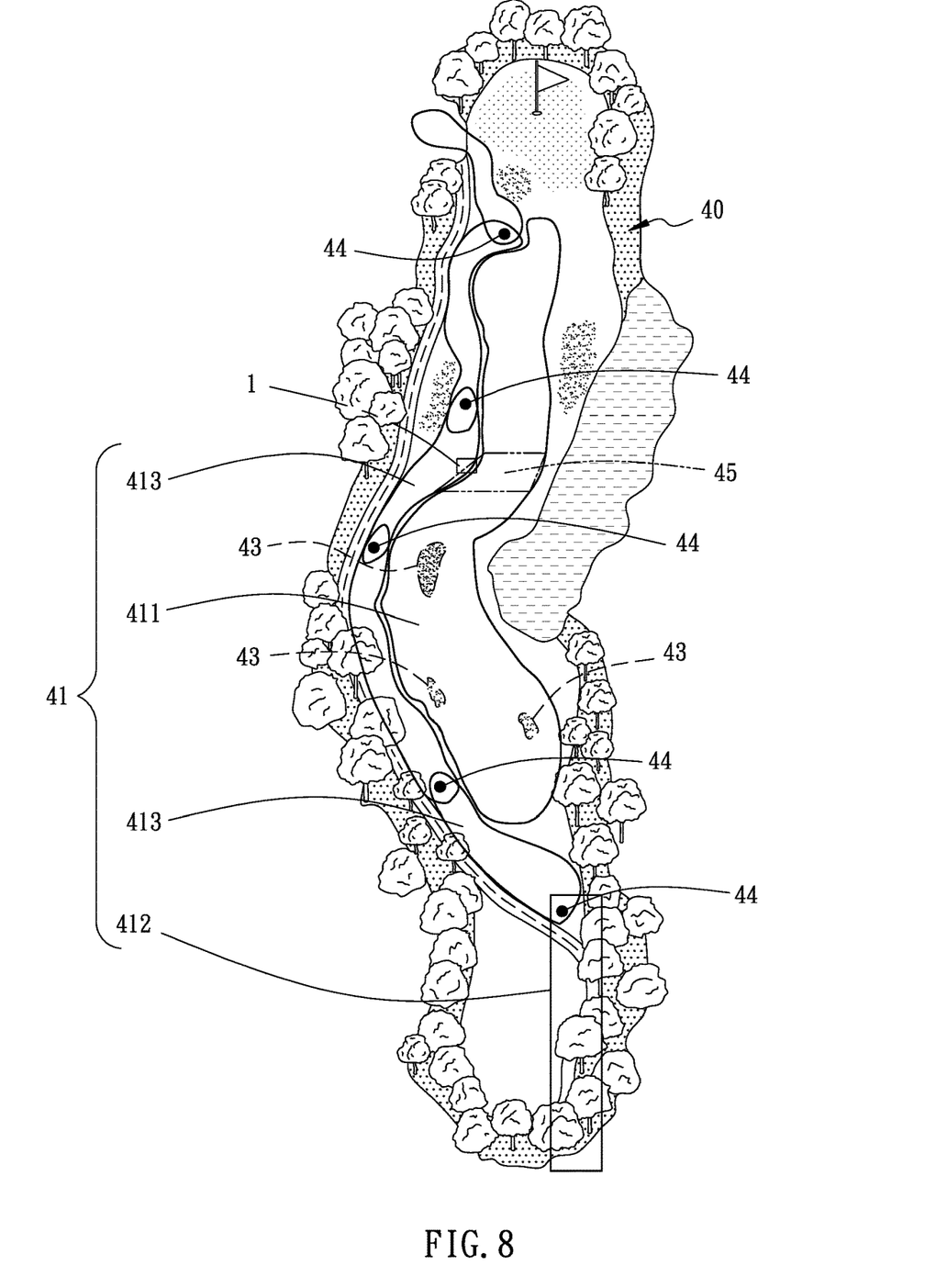
FIG. 8 is a schematic view illustrating the movement zones in the field information comprising sidewalk zones, and the guiding zones generating a limitation range corresponding to the vehicle, such that the vehicle is able to enter.

When the vehicle 1 is in the golf course and located in the sidewalk zone 413 set by the establishment module 613, the user 5 is able to control the vehicle 1 to move in the operation mode. When the processing module 11 of the vehicle 1 receives an allowance signal transmitted by the surveillance module 612, the user 5 is allowed to control the vehicle 1 to turn and face the guiding zone 411 in the operation mode through the driving device 3 or the remote control device 6; also, the processing module 11 generates a limitation range 45 corresponding to the guiding zone 411. Therefore, the user 5, through the driving device 3 or the remote control device 6, controls the vehicle 1 to enter and be limited to move in the limitation range 45 in the operation mode. Notably, upon the vehicle 1 receiving the allowance signal when located in the sidewalk zone 413, when the user 5 controls the vehicle 1 to turn and face the guiding zone 411, the limitation range 45 is immediately generated by the processing module 11.

Additionally, referring to FIG. 7, when the guiding zone 411 is not under an optimal situation, and the vehicle 1 has to be forbidden from entering the guiding zone 411 from the manual control zone 412, the surveillance module 612 sets the vehicle 1 to enter the sidewalk zone 413 from the manual control zone 412. When the guiding zone 411 is in a relatively stable situation which allows the vehicle 1 to temporarily enter thereinto, the user 5 is able to control the vehicle 1 to turn by 90 degrees through the driving device 3 or the remote control device 6 in the operation mode, whereby the vehicle 1 transversely crosses into the guiding zone 411. At the same time, the head portion of the vehicle 1 reaches the border of the sidewalk zone 413 and partially enters into the guiding zone 411, and the processing module 11, with the border of the sidewalk zone 413 reached by the vehicle 1 as a central basis, sets a limitation range 45 in which the vehicle 1 is able to transversely move. Subsequently, the user 5 is allowed to control the vehicle 1 through the driving device 3 or the remote control device 6 to enter the limitation range 45, and the processing module 11 simultaneously limits the vehicle 1 to move in the limitation range 45.

With the foregoing configurations, effects of the present invention will be illustrated below.

The golf course route guiding system 100, according to the course situation in which the user 5 plays or the weather, dynamically arranges the route for the vehicle 1 to enter different movement zones 41 according to the demands of the movement zones 41, so as to assign the route range 42 for the vehicle 1, thus improving the disadvantage of the conventional fixed route.

The golf course route guiding system 100 dynamically arranges the route to prevent different vehicles 1 from moving along the identical route, so as to share the force born by the ground surface and lower the cost of maintenance. Also, according to the field maintenance schedule, the route ranges 42 are able to be adjusted whenever necessary, facilitating the convenience of the course maintenance operation.

The golf course route guiding system 100 controls the vehicle 1 to move in the following mode or the operation mode, so as to fulfill different demands of various terrain situations of the movement zones 41.

The golf course route guiding system 100 sets the target points 44 of each movement zone 41 as the goal of the movement for the vehicle 1, so as to meet the goal and direction orientation demand during the movement of the vehicle 1.

The golf course route guiding system 100 is able to set obstacle zones 43 in each route range 42 according to the actual environmental conditions or maintenance schedule, so as to control the vehicle 1 to move along the assigned route range 42 and avoid the obstacle zones 43, achieving a guidance and obstacle avoidance effects.

The surveillance program product 60 of the golf course route guiding system 100 is applied by the administration center of the golf course. Therefore, the administrator is allowed to handle the overall situation of the golf course, the current location of each vehicle 1, and the movement status of each vehicle 1 through the surveillance program 61 of the surveillance program product 60, achieving a high efficiency administration.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A golf course route guiding system, comprising:
a controller disposed on a vehicle, the controller comprising a memory module, a positioning module, and a processing module, the memory module storing a field information of a golf course and setting the filed information into a plurality of movement zones, with at least one route range being set in each of the movement zones, two neighboring movement zones partially overlap, and each of the movement zones has a target point, the positioning module generating a location signal indicating a current location of the vehicle, the processing module receiving the location signal and determining one of the movement zones of the corresponding field information of the golf course in which the vehicle is located, and the processing module assigning the route range set in the corresponding movement zone and sending the assigned the route range to the processing module, so that the processing module controls the vehicle to move in the assigned route range; the vehicle is limited to move in the assigned route range in one of the movement zones toward the target point of another one of the movement zones, wherein when the vehicle moves from one of the movement zones into another one of the movement zones, the processing module reassigns the route range corresponding to the movement zone in which the vehicle is located.

2. The golf course route guiding system of claim 1, wherein when the processing module determines that the vehicle approaches a border of the route range according to the location signal, the processing module generates and sends a warning signal.

3. The golf course route guiding system of claim 1, wherein each movement zone comprises a guiding zone and a manual control zone; when the vehicle is located in the guiding zone, the processing module assigns the route range to limit the vehicle to move in the corresponding route range; when the vehicle is located in the manual control zone, the vehicle is controlled by a user to move in the manual control zone through a driving device or a remote control device.

4. The golf course route guiding system of claim 3, wherein the processing module controls the vehicle to move in a following mode or an operation mode; the vehicle comprises a guiding device coupled with the processing module of the controller, and the user wears a beacon device;

in the following mode, the guiding module generates a first signal, the beacon device receives the first signal and sends a second signal to the sensing module, the processing module generates a movement signal according to the first signal and the second signal, and the processing module controls the vehicle according to the movement signal to follow the user to move in the guiding zone according to the assigned route range; in the operation mode, the user controls the vehicle to move through the driving device of the vehicle or the remote control device.

5. The golf course route guiding system of claim 4, wherein in the guiding zone, when the processing module fails to receive the location signal sent by the positioning module, the processing module enables the user to control the vehicle to move in the operation mode.

6. The golf course route guiding system of claim 1, wherein an obstacle zone is set in the route range stored by the memory module; the processing module, according to the location signal, sets the assigned route range, and acquires the obstacle zone of the assigned route range stored in the memory module; the vehicle accordingly moves in the assigned route range and avoids the obstacle zone.

7. The golf course route guiding system of claim 1, further comprising a surveillance program product, which stores a surveillance program loaded and run by a terminal device; the surveillance program comprises a graphic information module and a surveillance module; the graphic information module stores the field information, the movement zones, and the route ranges; the controller is signally connected with the terminal device; the surveillance module of the surveillance program receives the location signal and acquires an information stored by the graphic information module, so as to determine one of the movement zones in which the vehicle is located; the surveillance module assigns the route ranges set in the corresponding movement zone, and the assigned route range is sent to the processing module, so that the processing module limits the vehicle to move in the assigned route range; when the controller is unable to be signally connected with the terminal device, the processing module of the controller generates a movement range limitation of the vehicle.

8. The golf course route guiding system of claim 7, wherein the surveillance program has an establishment module, the establishment module acquires the field information of the golf course and is applied for setting the movement zones in the field information and the route ranges corresponding to each movement zone; the establishment module is applied for setting an obstacle zone in the route range; the surveillance module, according to the received location signal, assigns the route range and the obstacle zone in the corresponding route range, and the route range and the obstacle zone are transmitted to the processing module of the controller; the vehicle accordingly moves in the assigned route range and avoids the obstacle zone.

9. The golf course route guiding system of claim 7, wherein the movement zone comprises a guiding zone, a manual control zone, and a sidewalk zone; the manual control zone and the sidewalk zone partially overlap; when the vehicle is located in the guiding zone, the surveillance module assigns the route range for limiting the vehicle to move in the assigned route range; when the vehicle is located in the manual control zone, the vehicle is controlled to move in the manual control zone by an user through a driving device or a remote control device; when the vehicle is located in the sidewalk zone, the user controls the vehicle to move through the driving device or the remote control device; when the processing module receives an allowance signal transmitted by the surveillance module, the user is able to control the vehicle to turn and face the guiding zone through the driving device of the vehicle or the remote control device, such that the processing module generates a limitation range according to the guiding zone, and the user, through the driving device of the vehicle or the remote control device, controls the vehicle to enter and be limited to move in the limitation range.

10. The golf course route guiding system of claim 7, wherein each movement zone comprises a plurality of route ranges; a plurality of vehicles are provided; when each vehicle enters the same movement zone, respectively, the surveillance module assigns each vehicle to move in different route ranges through a manner of distribution or random calculation, respectively; when the surveillance module, according to the location signal, determines that the vehicle approaches a border of the route range, the surveillance module generates a warning signal and sends the warning signal to the processing module, whereby the processing module sends out the warning signal.

* * * * *